UNITED STATES PATENT OFFICE.

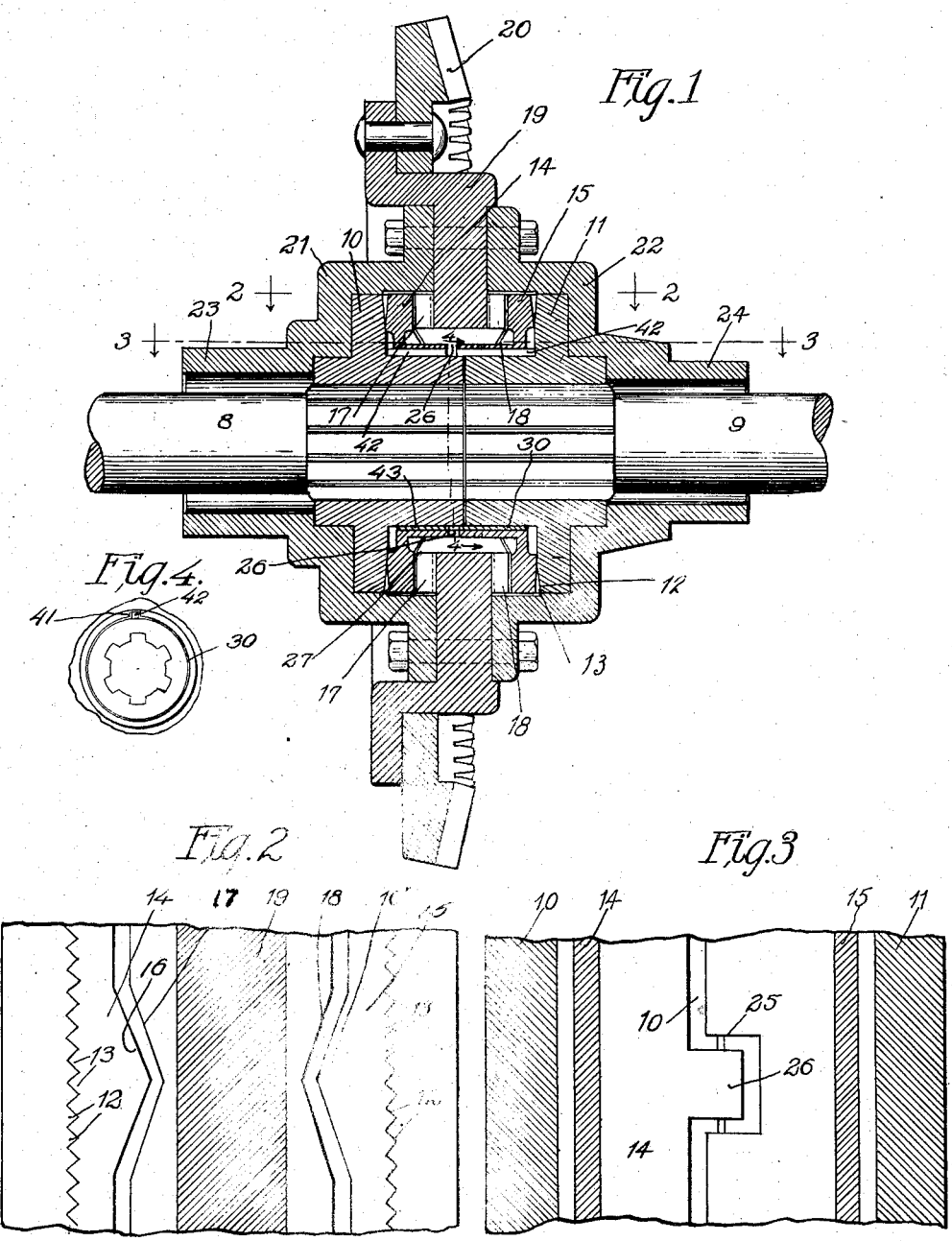

WILLIAM LUXMORE, OF CHICAGO, ILLINOIS.

VEHICLE DRIVING MECHANISM.

1,275,952.   Specification of Letters Patent.   Patented Aug. 13, 1918.

Application filed March 22, 1915. Serial No. 15,995.

*To all whom it may concern:*

Be it known that I, WILLIAM LUXMORE, a citizen of the United States, residing at Chicago, in the county of Cook and State of Illinois, have invented certain new and useful Improvements in Vehicle Driving Mechanism, of which the following is a full, clear, concise, and exact description, reference being had to the accompanying drawings, forming a part of this specification.

My invention relates to vehicle driving mechanism, and has for its object the provision of improved mechanism of this class which is positive in its operation, sturdy in construction, and which can be economically manufactured. The construction of my improved driving mechanism is such that the driving wheels of a vehicle with which the mechanism is associated are permitted to revolve at different speeds, as, for instance, when the vehicle turns a corner or otherwise departs from a straight line of travel, and this result is accomplished without employing any one of the several forms of complicated differential gears which have been almost universally employed in the past to secure this result.

Generally the device consists in two clutch members rigidly fixed to abutting ends of two live axle sections, the clutch members being preferably positioned near the central portion of the axle. Rotatably mounted around these clutch members I provide an engine driven member in the form of a ring between which and the clutch members are provided devices whereby the ring may be clamped to either one or both of the clutch members. The device is so arranged that the power from the engine is transmitted only to the slower rotating rear wheel when the vehicle departs from a straight line of travel. Novel mechanism is employed for preventing the clutch devices from locking the faster traveling wheel to the engine driven member when it is caused to rotate ahead of its companion wheel.

My invention contemplates the provision of a number of improved features of construction, all of which are fully set forth in the following detailed description and are illustrated in the accompanying drawings in which:

Figure 1 is a sectional view taken through the driving mechanism, the axle sections here being shown in elevation.

Fig. 2 is an enlarged horizontal sectional view taken along the line 2—2 of Fig. 1 and looking in the direction indicated by the arrows.

Fig. 3 is a horizontal sectional view taken along the line 3—3 of Fig. 1 and looking in the direction indicated by the arrows.

Fig. 4 is a fragmentary cross sectional view taken along the line 4—4 of Fig. 1 and looking in the direction indicated by the arrows.

Similar reference characters refer to similar parts throughout the several views.

Referring to Fig. 1, I have illustrated the two live axle sections at 8 and 9, each terminating at its outer end in a vehicle driving wheel. Keyed to the axle section 8 is a collar 10. A similar collar 11 is keyed to the axle section 9. Both of the collars 10 and 11 are provided with teeth 12 which coöperate with engaging teeth 13 carried by sleeves or clutch members 14 and 15. The inner faces of the sleeves 14 and 15 carry cam surfaces or major clutch teeth 16 and 16', respectively, which are arranged to coöperate with the cam surfaces or major clutch teeth 17 and 18 carried by the engine driven ring 19. A suitable beveled gear 20 may be fixed to the ring 19 so that power may be transmitted from the engine to the ring. To hold the ring 19 in position, and also to act as a casing for the sleeves and collars, I employ side pieces 21 and 22, suitable roller races being provided at 23 and 24 so that a bearing is secured for the rotating ring.

As will be more clearly brought out hereafter it is necessary that the sleeves 14 and 15 be arranged so that angular movement of one relative to the other is limited. In order to provide for this limitation of movement the sleeve 15 is notched at 25 and accommodates a tongue 26 carried by the sleeve 14. The tongue 26 is slightly less in width than the notch 25 so that a slight angular movement of either one of the sleeves is permitted before the tongue and the wall of the notch engage one another. Interposed between the sleeve or clutch member 15 and the collar 11 is a split spring sleeve 30 which has frictional engagement with the collar, the ends of the split sleeve being upturned as shown at 41. The upturned ends of the spring sleeve extend into the groove 42 provided in the sleeve 15 so that the spring is angularly attached to the clutch member. A similar spring sleeve is provided at 43 between the collar 10 and the sleeve or clutch member 14 and is attached to the clutch member 14 in a like manner.

The operation of the device is as follows:

Let us assume first that the vehicle is to be driven in a straight line of travel. The beveled gear 20 and also the ring 19 are rotated so that the cam surfaces 17 and 18 carried by the ring 19 engage the cam surfaces 16 and 16' carried by the collars 14 and 15. As these cam surfaces engage one another the sleeves 14 and 15 are caused to move outwardly into mesh with the teeth 12 of the collars 10 and 11 due to the frictional connection between the sleeves and the collars, and as soon as the sleeves 14 and 15 are locked to the collars 10 and 11 through the teeth 12 and 13 the collars 10 and 11 are rotated so that the shafts 8 and 9 upon which the vehicle wheels are mounted are caused to rotate to drive the vehicle. If now the vehicle is caused to travel around a curve or to depart from a straight line of travel one of the shafts, let us say the one designated at 9, is driven, or caused by the vehicle on account of its departure from the straight line of travel to advance ahead of the adjacent axle section 8. When this occurs the sleeve 15 which coöperates with the collar 11 will be advanced a trifle ahead of the sleeve 14 due to its engagement with the faster traveling collar 11. If some means were not now provided for limiting movement of the sleeve 15 relative to the sleeve 14 the first mentioned sleeve will be caused by the collar 11 to engage the opposite cam face of the ring 19 and thus prevent further rotation of the axle section 9. To take care of this the notch 25 and tongue 26 are provided, as has been described. When the sleeve 15 is advanced a certain distance, which distance is not enough to clamp the opposite engaging face of the ring 19 with the cam carried by the sleeve, the sleeve 15 is held against further angular movement and permits the collar 11 to advance ahead of it, the teeth 12 carried by the collar serving to move the sleeve out of mesh with the collar. Power from the engine is then transmitted entirely to the slower rotating axle which in this case would be the axle illustrated at 8. The cams 17 and 18 may either be formed from the ring 19 or may be made in separate pieces to be secured to the ring 19 when the device is assembled.

What I claim as new and desire to secure by Letters Patent of the United States is:

1. A device of the class described comprising a rotatable driving element, a pair of cylindrical driven members disposed concentric therewith, a spring sleeve disposed around each cylindrical member for frictionally engaging the convex wall thereof, and a clutch member angularly fixed to each of the spring sleeves for connecting the driving element with its associated driven member.

2. Differential mechanism comprising a driving member having major clutch teeth on both sides thereof, shiftable clutch members having major clutch teeth on one side in mesh with teeth of the driving member, each shiftable clutch member having minor clutch teeth on one side thereof, means carried by the shiftable clutch members to permit and to limit relative rotative movement of the shiftable clutch members and to allow said members to move toward and from the driving member, driven members each formed with minor clutch teeth on one side for operative engagement with the minor clutch teeth of the respective shiftable clutch members, each of said driven members being provided with a cylindrical portion, and a spring sleeve disposed around each cylindrical portion for frictionally engaging the convex wall thereof, each of the spring sleeves being angularly fixed to one of the clutch members.

3. Differential mechanism comprising a driving member having major clutch teeth on both sides thereof, shiftable clutch members having major clutch teeth on one side in mesh with teeth of the driving member, each shiftable clutch member having minor clutch teeth on one side thereof, means carried by the shiftable clutch members to permit and to limit relative rotative movement of the shiftable clutch members and to allow said members to move toward and from the driving member, driven members each formed with minor clutch teeth on one side for operative engagement with the minor clutch teeth of the respective shiftable clutch members, each of said driven members being provided with a cylindrical portion, and a split spring sleeve disposed around each cylindrical portion for frictionally engaging the convex wall thereof, the split portion of the sleeve being provided with an extension connected with one of the shiftable clutch members.

4. A device of the class described comprising a driving part having major clutch teeth on both sides thereof, driven members mounted concentric with the driving part, each having minor clutch teeth and a cylindrical portion, a spring sleeve disposed around the cylindrical portion of each driven member, a shiftable clutch member mounted around each of the spring sleeves and secured thereto, each clutch member having major clutch teeth on one side thereof for engagement with the teeth of the driving part, and minor clutch teeth for engagement with the teeth of one of the driven members, and means carried by the shiftable clutch members to permit and to limit relative rotative movement of the clutch members and to allow said clutch members to move toward and from the driving part.

5. A device of the class described comprising a driving part having major clutch teeth on both sides thereof, driven members mounted concentric with the driving part, each having minor clutch teeth and a cylindrical portion, a spring sleeve disposed around the cylindrical portion of each driven member, a shiftable clutch member mounted around each of the spring sleeves, each clutch member having major clutch teeth on one side thereof for engagement with the teeth of the driving part, and minor clutch teeth for engagement with the teeth of one of the driven members, and means carried by the shiftable clutch members to permit and to limit relative rotative movement of the clutch members and to allow said clutch members to move toward and from the driving part.

In witnesse whereof I hereunto subscribe my name this 6th day of March, A. D. 1915.

WILLIAM LUXMORE.

Witnesses:
ROBERT F. BRACKE,
ALBIN C. AHLBERG.